(12) United States Patent
Margueray et al.

(10) Patent No.: US 12,377,813 B2
(45) Date of Patent: Aug. 5, 2025

(54) METHOD FOR IDENTIFYING STOLEN VEHICLES

(71) Applicants: Cyril Margueray, Salinelles (FR); David Agostinho, Mauguio (FR)

(72) Inventors: Cyril Margueray, Salinelles (FR); David Agostinho, Mauguio (FR)

(*) Notice: Subject to any disclaimer, the term of this patent is extended or adjusted under 35 U.S.C. 154(b) by 0 days.

(21) Appl. No.: 18/550,089

(22) PCT Filed: Mar. 14, 2022

(86) PCT No.: PCT/EP2022/056493
§ 371 (c)(1),
(2) Date: Sep. 11, 2023

(87) PCT Pub. No.: WO2022/189672
PCT Pub. Date: Sep. 15, 2022

(65) Prior Publication Data
US 2024/0140358 A1    May 2, 2024

(30) Foreign Application Priority Data
Mar. 12, 2021 (FR) ...................... 2102463

(51) Int. Cl.
*B60R 25/102* (2013.01)
*G08G 1/00* (2006.01)
*G08G 1/017* (2006.01)

(52) U.S. Cl.
CPC ......... *B60R 25/102* (2013.01); *G08G 1/0175* (2013.01); *G08G 1/205* (2013.01)

(58) Field of Classification Search
CPC  G08G 1/00; G08G 1/08; G08G 1/087; G08G 1/096; G06Q 20/00; G06Q 20/32; G06Q 20/322; G06Q 20/325; H04W 4/00; H04W 4/02; H04W 4/40
See application file for complete search history.

(56) References Cited

U.S. PATENT DOCUMENTS

| | | | |
|---|---|---|---|
| 7,504,965 B1 | 3/2009 | Windover et al. | |
| 2006/0082471 A1 | 4/2006 | Rockett et al. | |
| 2008/0249939 A1* | 10/2008 | Veenstra | G06Q 20/322 |
| | | | 705/44 |
| 2015/0243165 A1* | 8/2015 | Elsheemy | G08G 1/096775 |
| | | | 340/906 |

FOREIGN PATENT DOCUMENTS

| | | |
|---|---|---|
| EP | 0573320 A1 | 12/1993 |
| EP | 1878628 A1 | 1/2008 |
| FR | 3027142 A1 | 4/2016 |

* cited by examiner

*Primary Examiner* — Van T Trieu
(74) *Attorney, Agent, or Firm* — Craft Chu PLLC; Andrew W. Chu

(57) ABSTRACT

The method for identifying stolen vehicles by an information management system includes using at least one centralized user data management server provided with data storage means, a processing unit and device for communicating data in and out of the server with a global network of the Internet type, and remote terminals held by users and provided with a dedicated software application for organizing and communicating input data.

8 Claims, 1 Drawing Sheet

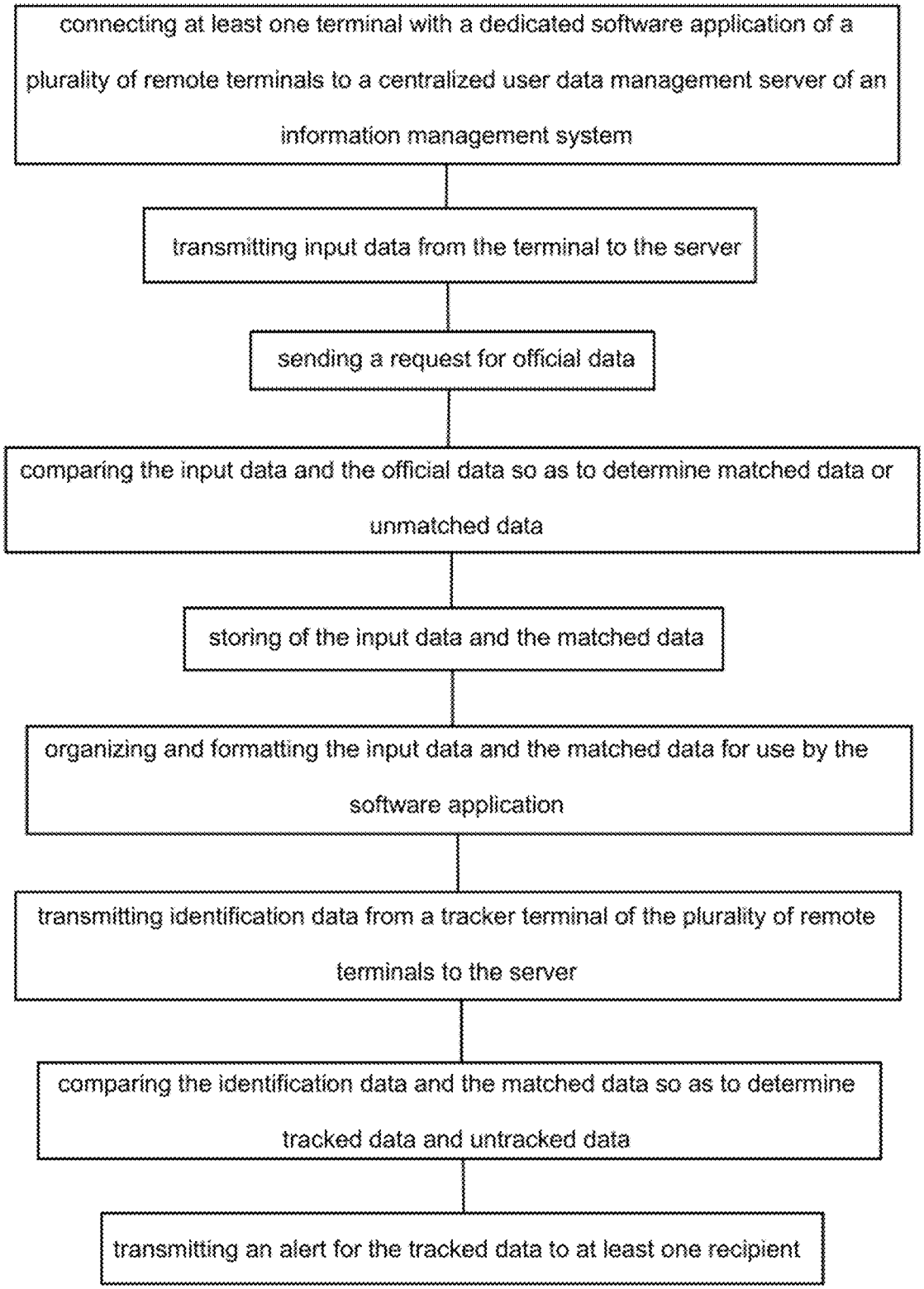

METHOD FOR IDENTIFYING STOLEN VEHICLES

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention very generally relates to the problem of stolen vehicles, and more particularly to a method for identifying these stolen vehicles by means of an information management system based on all current means of accessing and centralizing information. The invention will allow the victims of vehicle theft to make the information accessible to a community that will be able to be able to locate it by entering a state of vigilance relating to one or more vehicles identified as stolen, or by using recognition tools.

2. Description of Related Art Including Information Disclosed Under 37 CFR 1.97 and 37 CFR 1.98

It is useful to note the statistics: in France, approximately 120,000 vehicles were stolen from individuals in 2020 alone. It should be noted that this number does not take into account thefts of business vehicles (vehicle rentals, road tractors or farm tractors), or thefts of cycles (motorcycles, scooters, quads, etc.). It is therefore obvious that the probability is high that everyone, in the course of their usual movements, unknowingly comes across vehicles that have been stolen.

The idea on which the invention is based is to bring together a potentially high number of persons to search for stolen vehicles, with degrees of involvement which can be very diverse, both in France and elsewhere in the world. In fact, anyone with the right information and a willingness to act is capable of searching for and possibly finding stolen property.

Of course, a form of control and filtering is required when sharing information about a vehicle theft; it is obviously necessary that only those who can legitimately report information are able to do so, namely the owners of vehicles reported stolen, or alternatively the people who are lawfully permitted to use them. Thus, a database of stolen vehicles can be composed, in practice by the victims of the thefts, which constitute a first category of users of the system.

The power of current decentralized information networks, which in particular constitute a formidable echo chamber, does the rest for this particular cause: by sharing various appropriate data, it is possible by means of the present invention, to quickly implement an efficient search tool covering territory that is both potentially extremely vast and highly targeted. Thus, a second category of users of the invention exists: the people to whom access to this information is given, who are volunteers mobilized to help their search, but who are not themselves the victims of thefts.

To date, despite the power of the means for accessing any type of information that is available and used by all, there is no means for automatically alerting a community of people that a vehicle theft has taken place in a particular geographical area and time period. The only means to retrieve one's stolen vehicle is essentially to count on the work of law enforcement. This first involves placing traveling to file a complaint, and then an investigation conducted by the officers assigned to the case. However, it is publicly known that police officers, gendarmes, city police, etc. are largely insufficient. In addition, they have to deal with a multitude of missions that are increasingly diverse and varied, and searching for stolen property is not a priority for them compared to security missions that touch on public order.

In addition, the means assigned to such missions are often not calibrated and/or sufficient for the task; in particular, the government has few or no digital media and/or centralized informative tools that make it possible to easily obtain accurate information on stolen vehicles within a geographical area, combining search parameters such as the date of theft, the precise coordinates of the crime's location, etc. In short, no network for searching for stolen vehicles has been created or is even possible in the current state of affairs.

It is also to be pointed out that such searching obviously involves travel in order to carry out active investigations at crime scenes. To show the deficiencies of the current system in terms of personnel assigned to these missions, we have considered some statistics: law enforcement currently has about 250,000 agents on duty, of which approximately one-quarter is present in the field and is therefore more likely to locate stolen vehicles. Assuming that all of these personnel are devoted solely to this mission, 24 hours a day, which is of course an unrealistic assumption but useful for the sake of demonstration, this accounts for only 0.37% of the French population, a ludicrous number compared to millions of potential "trackers" who could be mobilized by wisely using the current means of storing, managing, and distributing information sorted and correctly listed under a topic such as stolen vehicles. This observation is the same in most countries around the world.

In terms of tools that take advantage of the possibilities offered by the technologies of our time, in France, the only means of search equipment consists of a so-called "ALPR" system (for automated license plate readers) installed on police vehicles. Not all police stations have them, and they often have only one. There are already not enough vehicles in good working order, and vehicles equipped with ALPRs are more often used as replacements for other vehicles, and thus diverted from their primary mission. The ALPR system also encounters drawbacks specific to its technology since the plates can only be read from certain reading angles and only if the speed of the vehicle is very low, to say nothing of inaccessible locations (private residence parking, etc.) All of these reasons greatly limit their effectiveness.

BRIEF SUMMARY OF THE INVENTION

The present invention remedies the multiple disadvantages and insufficiencies mentioned previously, by proposing to use current digital information management technologies from and to any person interested in the problem of vehicle thefts, either because they are the victim, or because they want to participate in a collective effort to fight this scourge.

BRIEF DESCRIPTION OF THE SEVERAL VIEWS OF THE DRAWINGS

The FIGURE is a schematic illustration of the method of the present invention.

DETAILED DESCRIPTION OF THE INVENTION

To this end, the invention relates to a method for stolen vehicles, including identifying stolen vehicles by means of an information management system comprising at least one centralized user data management server provided with data storage means, a processing unit and means for communicating data in and out of the server with a global network of the Internet type, remote terminals held by users and provided with a software application for organizing and communicating input data identifying a user who is the victim of a theft and a vehicle reported stolen, characterized in that it comprises the following steps:

Connecting at least one terminal of a plurality of remote terminals to a centralized user data management server of an information management system via a dedicated software application on the terminal, the server being comprised of a data storage means, a processing unit, and a means for communicating data in and out of the server with a global network of an internet type, also connecting a terminal to a server of the system via said dedicated software application;

Transmitting input data from the terminal to the server, said input data being comprised of identity of a stolen vehicle and identity of a user of the terminal who owns said stolen vehicle, also transmitting, to a server of the system, input data identifying a user who is the victim of a theft and a vehicle reported stolen;

Sending a request to at least one dedicated server for official data, said official data being comprised of a list of identities of vehicles and a list of identities of users who own a corresponding vehicle of said identities of vehicles, the means for communicating data of the server sending the request to the dedicated server and receiving said official data from the dedicated server, also sending, by the communication means of the server, a request to at least one dedicated server listing vehicle owners, in order to obtain official data matching a vehicle and its owner;

Comparing the input data and the official data with the processing unit of the server so as to determine matched data or unmatched data, also, comparing, by the processing unit of the server, the input data and the official data;

Storing of the input data and the matched data in the data storage means, also, in case of a match between said input and official data, storing of the input data by the system data storage means;

Organizing and formatting the input data and the matched data for use by the software application with the processing unit of the server, also organizing and formatting said data, by the processing unit of the server, for use by software applications;

Transmitting identification data from a tracker terminal of the plurality of remote terminals to the server, the identification data being comprised of identity of a tracked vehicle, also transmitting to the server, by a tracker-user, the identification data of a vehicle identified by the tracker-user;

Comparing the identification data and the matched data with the processing unit of the server so as to determine tracked data and untracked data, also comparing, by the processing unit of the server, identification data with the input data about the vehicle reported stolen;

transmitting an alert for the tracked data to at least one recipient in the storage means with the means for communicating data of the server, also, in case of a match, transmitting, by the communication means of the server, an alert to at least one recipient stored in the storage means.

On a hardware level, the method of the invention can be implemented by its users via various access means, for example computer terminals, or mobile terminals of the mobile telephone or tablet type, via at least one website or at least one application installed on the hardware thus described. The method of the invention aims to centralize and organize information, then to exchange it in an intelligible manner classified according to multiple criteria to make the searches easier and especially to drastically widen the scope of such a search, in particular but not exclusively its geographical coverage.

Each announcement that results from the organizing, by the processing unit, of the data can be seen by a large number of users recorded on the site, and most particularly by those who are the most involved in particular because they are in the same geographic scope as the victim-user or as the location of the disappearance, as will be explained in more detail below.

The processing unit of the server comprises means for selecting and storing a multitude of user categories comprising at least the theft victim-users and the tracker-users. The so-called tracker-users are in practice contributors to the system, in other words the members of the community who offer their services to attempt to identify a stolen vehicle.

According to one possibility, the means for selecting tracker-users comprise criteria including at least one geographical sector, geolocation data, and contact coordinates. The server may further comprise means for selecting groups of users to whom a message is sent, at their contact coordinates, containing information on a stolen vehicle.

For the alerts sent by the system to the selected users, it should be noted that the processing unit may compare the location data of the stolen vehicle and the fixed or geolocation coordinates of the tracker-users, and select as recipients of information about a stolen vehicle the tracker-users in the same geographical sector.

Therefore, by virtue of their geolocation, the tracker-users can be notified of vehicle thefts and the places where they occurred, mobilizing for efficiency reasons only those who are close to the property to be searched for. Due to the geolocation of people and by means of features such as those of their smartphones (video camera, still camera, microphone), the whole population, regardless of the country, may potentially participate in the search for stolen vehicles and quickly send relevant information.

The tracker-users can in fact be informed of any stolen vehicle post, according to criteria that they have previously opted for. For their convenience, these notices will take the form of text messages, push notifications, or emails. Whenever a submission is validated, the administrators will automatically send the tracker-users who have previously opted-in a notice that corresponds to their zone criterion, or even a vehicle make, if it is an additional criterion. They can also freely opt to be informed only about stolen vehicles around them, within a radius that they will be able to determine, which may prove appealing for those who are regularly on the move.

The input data for identifying a theft victim-user and the vehicle reported stolen comprise at least personal coordinates and a credential, vehicle identification means including the license number, a proof of ownership of the vehicle reported stolen, and a document related to the filing of a complaint.

In fact, the theft victim-user must obviously file a complaint with the relevant police and gendarme services, so that they can, as the case may be and in an official and lawful manner, retrieve the vehicle and, in such a case, return it. The documents to be provided may, for example, be the vehicle registration card (or a sworn statement if the vehicle registration card was stolen), an invoice for the vehicle corresponding to the name of the owner who must necessarily be the person reporting the theft, a valid credential (national identity card, passport, driver's license) matching the name on the vehicle registration card, and finally insurance policy references.

Other data that are interesting but optional in certain cases may be the precise address of the theft, the date, the make of the vehicle, optionally a photo of the property, and features or observations deemed useful to facilitate the search. With the method of the invention, in other words, and more generally, any person whose vehicle has been stolen—whether registered or not—(car, truck, two-wheeler, bike, tractor, boats, jet-ski) can post a report on the site or app while submitting a certain number of mandatory documents, which are analyzed before being published.

If the person does not provide a document within 5 days proving the existence of an official complaint, for example the copy of the receipt of the complaint filing, the post is deleted. The announcement then appears for a period of a month for example, during which time the owner is, in some cases, indemnified by their insurance. Beyond the period of one month, the insurance company can decide whether it wants to keep the post on the site and/or app.

As regards personal coordinates, the post submitter may provide an email address as well as a valid telephone number. A personal code for validating their submission is then sent thereto.

The identification data of a vehicle spotted by the tracker-user may comprise at least the location data of the spotted vehicle and data on the vehicle including at least the license number, and are data relating to at least the following categories:

Alphanumeric data to be input by the tracker-user;
　Voice and recorded data on audio data storage means on the server;
　Visual and recorded data on photo or video storage means on the server.

The tracker-users have access to all submitted vehicle posts, and the various criteria relating to the above categories make it possible to filter the posts according to several cumulative criteria, including but not limited to:

by predefined area (country, region, department, etc.);
　by make or model of vehicle, etc.;
　by date;
　by geographical radius around the geolocation point of the "tracker".

The search initiated by the tracker-user, by entering information that is then processed by the processing unit of the server, can take various manual or automated forms. In the first case, the search criteria to be included may be:

The license plate, VIN or serial number: in the case where the vehicle is recorded on the server, a message indicating that the input data correspond to a stolen vehicle will appear immediately on the tracker-user's screen. That person is then directed toward a space of the site dedicated to discoveries. Since a large number of vehicle thieves keep the license plates on the vehicle in question for several days at the chosen place of delivery, this search criterion is quite relevant. On the other hand, it should be noted that searching by VIN is particularly useful in the event that the original license plates are replaced by the thieves. Few of them have the techniques necessary to substitute a VIN consistent with the original VIN.

In a more automated manner, also supported by the method of the invention, the transmission to the server, by a tracker-user, of filmed visual data can trigger processing by the processing unit of the server, which continuously controls all the license plates filmed by the tracker-user for comparison to the identification input data stored by the storage means for the vehicle reported stolen, until the vehicle reported stolen is identified or filming is stopped by the tracker-user.

The camera of a smartphone or a tablet may also be used to take a still photo, by positioning the license plate of a vehicle within the frame in the manner of QR codes.

In both cases, if the vehicle is recorded in the database of the server, a message indicating that a vehicle is stolen immediately appears on the screen of the tracker's terminal. The app then directs the user to the space of the site dedicated to the discoveries.

It is substantially the same procedure when the tracker-user uses the app on their terminal to perform a license plate search by voice control in hands-free mode. The audio file is immediately converted into digital data which are compared to those recorded on the server.

Depending to the reporting means used, the idea is to provide as much information as possible (the plate, the make, the color, the serial number, the features, a photo as well as the whereabouts, etc.). In the event of success, that is, when the data entered has a match in the database of the server, the search post is blocked to other tracker-users, but still visible until it is retrieved by law enforcement. In the event of an error or mistaken alert, the post is unblocked to other tracker-users.

In no event do the tracker-users who have identified a stolen vehicle themselves intervene. They must only notify the system via the software application or the website, which trigger alerts to the competent authorities.

To summarize, the method of the invention makes it possible to quickly launch an alert, after a vehicle theft, with a community of users who share their locations. It facilitates the search and identification of these stolen vehicles by using several categories of information making it possible, for some of the automated processing by the processing unit of the system, such as the reading of the license plates of the vehicles via the cameras of smartphones and tablets, or the recognition of voice data via audio recordings of the tracker-users converted into digital data.

The centralization of the data and their redistribution subject to various criteria give the method of the invention a level of power and efficiency unmatched by current methods, which are too fragmented and whose decentralized organization impedes efficiency.

It should be noted that the examples of features given above do not limit the invention, and can also be widened to other mobile property than vehicles.

We claim:

1. A method for stolen vehicles, the method comprising the following steps:
   connecting at least one terminal of a plurality of remote terminals to a centralized user data management server of an information management system via a dedicated software application on the terminal, the server being comprised of a data storage, a processor, and a communicating data in and out of the server with a global network of an internet type;
   transmitting input data from the terminal to the server, said input data being comprised of identity of a stolen vehicle and identity of a user of the terminal who owns said stolen vehicle;
   sending a request to at least one dedicated server for official data, said official data being comprised of a list of identities of vehicles and a list of identities of users who own a corresponding vehicle of said identities of vehicles, the communicating data of the server sending the request to the dedicated server and receiving said official data from the dedicated server;
   comparing the input data and the official data with the processor of the server so as to determine matched data or unmatched data;
   storing of the input data and the matched data in the data storage;
   organizing and formatting the input data and the matched data for use by the software application with the processor of the server;
   transmitting identification data from a tracker terminal of the plurality of remote terminals to the server, the identification data being comprised of identity of a tracked vehicle;
   comparing the identification data and the matched data with the processor of the server so as to determine tracked data and untracked data; and
   transmitting an alert for the tracked data to at least one recipient in the storage means with the communicating data of the server.

2. The method for stolen vehicles, according to claim 1, wherein the plurality of remote terminals is comprised of a plurality of categorized terminals,
   wherein the categorized terminals are comprised of theft victim terminals corresponding to users who are identified as theft victims and tracker user terminals corresponding to users who are identified as trackers, said theft victim terminals being comprised of said at least one terminal, said tracker user terminals being comprised of said tracker terminal, and
   wherein the method further comprises the step of: selecting and storing the categorized terminals with the processor of the server.

3. The method for stolen vehicles, according to claim 2, wherein the step of selecting and storing the categorized terminals is determined by at least one criteria selected from a group consisting of: geographical sector, geolocation data, and contact coordinates.

4. The method for stolen vehicles, according to claim 3, further comprising the step of:
   transmitting the alert to at least one categorized terminal of said plurality of categorized terminals at contact coordinates of a corresponding user of the at least one categorized terminal,
   wherein the alert is comprised of information on the tracked vehicle.

5. The method for stolen vehicles, according to claim 4, wherein the identification data is further comprised of a tracked location data of the tracked vehicle, and
   wherein the at least one categorized terminal is selected by geographical sector said location data corresponding to said geographical sector.

6. The method for stolen vehicles, according to claim 1, wherein the input data is further comprised of personal coordinates and a credential of the user, a proof of ownership of said stolen vehicle, and a document related to filing of a complaint, and
   wherein said identity of said stolen vehicle is comprised of a license number.

7. The method for stolen vehicles, according to claim 1, wherein the identification data is further comprised of: location data of the tracked vehicle, and a license number of the tracked vehicle, and wherein the identification data is comprised of at least one category of a group consisting of:
   alphanumeric data input through the tracker terminal, voice and recorded data in the data storage of the server, and visual and recorded data in the data storage of the server.

8. The method for stolen vehicles, according to claim 7, wherein the identification data is comprised of continuously filmed visual license plate data,
   wherein the step of transmitting the identification data from the tracker terminal is continuous until the tracked data is determined, and
   wherein the step of comparing the identification data and the matched data is continuous until the tracked data is determined.

* * * * *